(12) United States Patent
Dulhunty

(10) Patent No.: US 6,943,290 B2
(45) Date of Patent: Sep. 13, 2005

(54) VIBRATION DAMPER FOR OVERHEAD POWER LINES

(75) Inventor: Philip Wellesley Dulhunty, Mortlake (AU)

(73) Assignee: Dulhunty Power (Aust) Pty. Limited, New South Wales (AU)

( * ) Notice: Subject to any disclaimer, the term of this patent is extended or adjusted under 35 U.S.C. 154(b) by 0 days.

(21) Appl. No.: 10/332,917

(22) PCT Filed: Jul. 13, 2001

(86) PCT No.: PCT/AU01/00840

§ 371 (c)(1),
(2), (4) Date: Aug. 26, 2003

(87) PCT Pub. No.: WO02/07278

PCT Pub. Date: Jan. 24, 2002

(65) Prior Publication Data

US 2004/0035601 A1 Feb. 26, 2004

(30) Foreign Application Priority Data

Jul. 14, 2000 (AU) ............................................. PQ8791

(51) Int. Cl.[7] .............................................. H02G 7/14
(52) U.S. Cl. .................... 174/42; 174/128; 174/130; 174/146
(58) Field of Search ......................... 174/42, 128, 130, 174/146

(56) References Cited

U.S. PATENT DOCUMENTS

| 3,582,983 | A | * | 6/1971 | Claren ......................... 174/42 |
| 3,584,133 | A | * | 6/1971 | Claren ......................... 174/42 |
| 3,662,084 | A | * | 5/1972 | Smrekar ....................... 174/42 |
| 3,711,624 | A | | 1/1973 | Dulhunty |
| 3,755,613 | A | * | 8/1973 | Kidder ......................... 174/42 |
| 3,813,481 | A | * | 5/1974 | Adams ........................ 174/130 |
| 4,527,009 | A | | 7/1985 | Hawkins |

FOREIGN PATENT DOCUMENTS

| DE | 35 35 778 A1 | 4/1987 |
| DE | 42 31 065 C1 | 11/1993 |
| GB | 2068081 A * | 8/1981 ............. F16F/7/10 |

* cited by examiner

Primary Examiner—Chau N. Nguyen
Assistant Examiner—Jinhee Lee
(74) Attorney, Agent, or Firm—The Webb Law Firm

(57) ABSTRACT

This invention relates to the design and manufacture of Stockbridge type vibration dampers for overhead power transmission lines. The invention provides a Stockbridge vibration damper comprising a pair of damping weights joined by a stranded steel cable, a clamp attached to the cable at a location intermediate the weights for attachment to an overhead power transmission line. The stranded steel cable comprises two or more layers of wire, wherein at the point of connection of the damping weight to the stranded steel cable one layer of wires is attached to the weight and the remaining layer(s) of wires is/are free to move.

24 Claims, 2 Drawing Sheets

VIBRATION DAMPER FOR OVERHEAD POWER LINES

FIELD OF THE INVENTION

The present invention relates to the design and manufacture of Stockbridge type vibration dampers for overhead power transmission lines.

BACKGROUND OF THE INVENTION

1. Field of the Invention

A Stockbridge vibration damper is a seismic device used for damping overhead power transmission lines. Stockbridge vibration dampers comprise of a pair of weights joined by a stranded steel cable (commonly known as a "messenger cable") and a clamp attached to the cable at a location intermediate the weights for attachment to an overhead power transmission cable. The configuration of weights mounted on the ends of the messenger cable is designed to resonate at frequencies determined to be appropriate for the vibration occurring in the transmission line cable.

2. Description of the Prior Art

Stockbridge vibration dampers function in two ways:

(a) by exerting a force out of phase with the conductor vibration, and (b) by dissipating the energy through flexing of the messenger cable. The flexing of the messenger cable causes inter-strand friction within the messenger cable which generates heat which is dissipated into the surrounding air.

A typical Stockbridge vibration damper employs a messenger cable comprised of two or more layers of helically wound strands of high tensile steel wire. For example, one common form of messenger cable comprises two layers of seven strands of helically wound high tensile steel wire. In recent years, greater interstrand friction has been obtained by using messenger cable with three strand layers comprising a total of 19 wires. As a result of the bending of the messenger wire caused by the movement of the weights those strands on the outside of the bend are subject to greater deflection than those on the inside of the bend so that with straight wires considerable sliding action and hence inter-strand friction would occur.

As a consequence of the wires being helically stranded, the wire on the outside of the bend at one position becomes the wire on the inside of the bend within one pitch length and vice versa. That is, a strand which is on the inside of the bend at one point is transferred to the outside of the bend at another point. This has the effect of cancelling out any effective sliding between the wires caused by the bending of the cable.

It has been found, particularly within 19 strand messenger cable, that each strand layer acts as a combined member and experiences considerable sliding over the adjacent strand layer. In the construction of Stockbridge type vibration dampers, it is necessary to attach the damping weights securely to the ends of the messenger cable and this is conventionally done in a number of ways, such as:

(a) compressing the damping weights onto the messenger cable;

(b) moulding/casting the damping weights onto the ends of the messenger cable;

(c) by using a potting metal to secure the damping weights onto the ends of the messenger cable;

(d) by attaching a tapered collett onto each end of the messenger cable and then pressing the tapered collett into a complementary tapered hole in the damping weight; or (e) passing all of the individual strands of the messenger cable through a hole in the damping weight and subsequently welding all of the strands onto the damping weight.

However, it has been found that in the region of the connection between the messenger cable and each of the damping weights the different layers of messenger cable become compressed or fused together such that sliding between the different layers is prevented. This in turn adversely affects the ability of the messenger cable to dissipate energy by means of friction between the layers.

It is therefore an object of the present invention to overcome or ameliorate at least one of the disadvantages of the prior art, or to provide a useful alternative.

SUMMARY OF THE INVENTION

To this end, the present invention provides a Stockbridge vibration damper comprising a pair of damping weights joined by a stranded steel cable, a clamp attached to the cable at a location intermediate the weights for attachment to an overhead power transmission line, said stranded steel cable comprising two or more layers of wire, wherein at the point of connection of the damping weight to the stranded steel cable one layer of wires is attached to the weight and the remaining layer(s) of wires is/are free to move.

More particularly, at the point of connection of the damping weight to the stranded steel cable, one layer of wires is attached to the weight, whilst the remaining layer(s) of wires is/are free to slide with respect to the attached layer of wires.

The present invention also provides a method of producing a Stockbridge vibration damper comprising a pair of damping weights joined by a stranded steel cable, a clamp attached to the cable at a location intermediate the weights for attachment to an overhead power transmission line, said stranded steel cable comprising two or more layers of wire, wherein at the point of connection of the damping weight to the stranded steel cable one layer of wires is attached to the weight and the remaining layer(s) of wires is/are free to move.

In practice, it has been found that it is possible to achieve this and still obtain sufficient holding strength so that the damping weights do not fall off in service.

Advantageously, the method of attachment of the damping weight to the messenger cable according to the present invention minimises static stresses in the messenger cable at the point of attachment and hence minimises the likelihood of fatigue failure of the cable.

It has been observed that with multi-strand cables such as a messenger cable, when the cable is subjected to bending forces, a sliding differential applies between each layer of cables. For example the outer layer of individual strands acts as a single tubular member sliding relative to its adjacent inner layer.

It is therefore important that the ends of each layer be allowed to move longitudinally in relation to the adjacent layers. It has been discovered that the attachment of vibration damper weights to the messenger cable by compression should be avoided if possible, as the compressive forces required to retain the damping weight on the messenger cable impart static stresses to the messenger cable at the point of reverse bending, leading to fatigue failure of the messenger wire over time.

BRIEF DESCRIPTION OF THE DRAWINGS

A preferred embodiment of the invention will now be described, by way of example only, with reference to the accompanying drawings in which.

PREFERRED EMBODIMENT OF THE INVENTION

Figure 1:
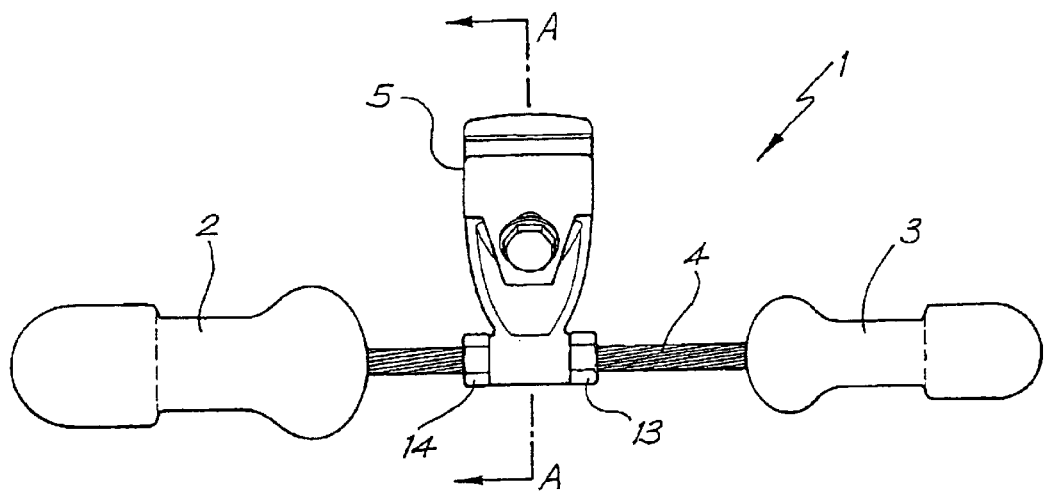
FIG. 1 is a front elevation view of a Stockbridge vibration damper.
Figure 3:
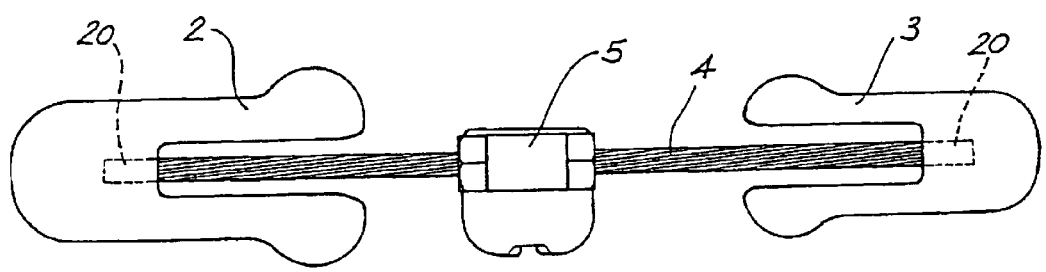
FIG. 3 is a plan view of the Stockbridge damper depicted in FIG. 1.

Referring to FIGS. 1 and 3, a Stockbridge vibration damper 1 is depicted. The damper comprises a pair of damping, weights 2, 3 joined by a stranded steel cable 4 known as a messenger cable. A clamp 5 is attached to the cable at a location intermediate the damping weights to provide for attachment to an overhead power transmission line.

The Stockbridge damper functions both as a reactive damper and a coulomb damper. This means that the damper sets up a reactive force in resonance with the frequency of vibration being experienced, but out of phase with it. At the same time it absorbs energy through interstrand friction of the messenger cable. This energy generates heat which is dissipated in the wind. The Stockbridge damper absorbs most of the energy in this way but a small amount of energy is reflected back into the span and a small amount transmitted through the damper to the suspension clamp.

The damping weights 2, 3 are typically formed from cast iron or zinc and dimensioned so that they harmonise with four overlapping tones or resonances spread over the range of frequencies experienced.

The messenger cable 4 is typically formed from high tensile steel wire. The messenger cable 4 may be of two layers of seven strands of helically laid up high tensile steel strands. In an alternative embodiment, the messenger cable may be formed from three layers of helically wound strands, totalling 19 wires.

Figure 2:
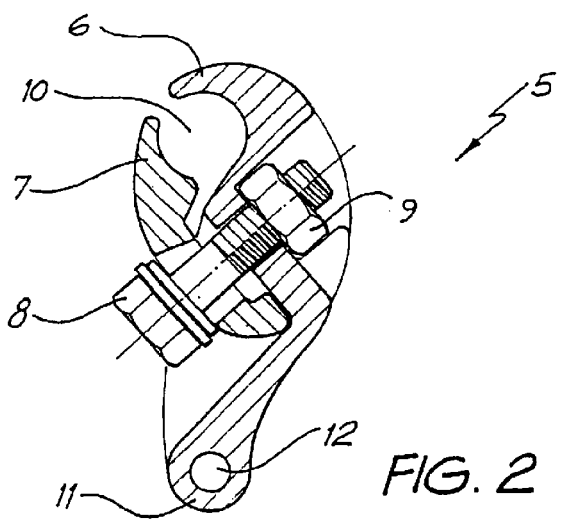
FIG. 2 is a cross-sectional elevation view through plane A—A of FIG. 1.

Referring to FIG. 2, the clamp 5 comprises a main clamp body 6 and a keeper plate 7 which are secured together by means of a bolt 8 and nut 9. The clamp body 6 and keeper plate 7 are adapted such that when connected they define an aperture 10 within which the overhead power line is located. By tightening the bolt and nut the keeper plate 7 is drawn towards the clamp body 6 and thereby secures the clamp 5 in position on the power line. At a lower end 11 on the clamp body 6 an aperture 12 is provided through which the messenger cable is passed, with the clamp body 6 being secured to the messenger cable 4 by crimping the clamp body at points 13, 14 shown in FIG. 1.

Figure 4:
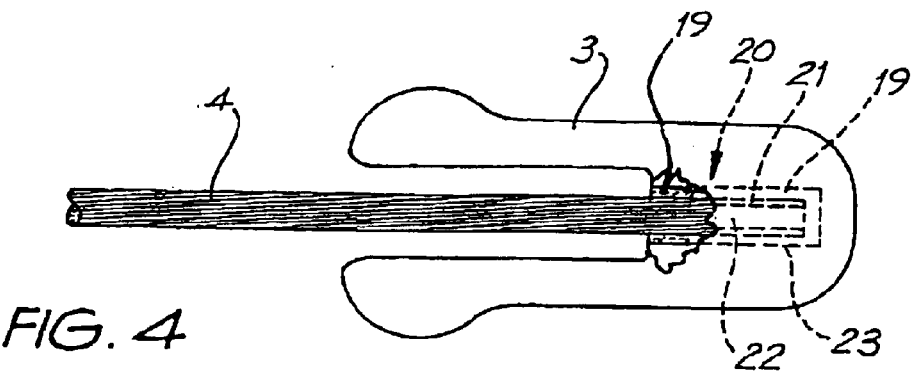
FIG. 4 is an enlarged view of one end of the Stockbridge damper illustrating one example of a connection between the messenger cable and a damping weight according to the present invention.

FIG. 4 illustrates one example of the connection 20 between the messenger cable 4 and the damping weight 3 according to the present invention. In accordance with the invention, only one strand layer of wires 21 is attached to the weight, with the remaining strands 22 being free to slide as the cable is bent. It is to be noted that the strand layer of wires attached to the weight may be either the outermost layer 21 or an inner layer 22.

A number of alternative embodiments for attaching only one layer of the messenger cable wires to the damping weight is proposed, including but not limited to the following examples:

(a) Employing a bonding metal or resin between the outer layers and the damping weight and preventing the bonding metal or resin from penetrating the interstices between the different layers. An example of such an embodiment is depicted in FIG. 4, wherein the damping weight 3 is provided with an aperture 23 into which the end of the messenger cable 4 is located. A bonding metal or resin 19 is placed in the aperture to provide a bond between the messenger cable 4 and the damping weight 3. In accordance with the present invention, the connection is such that either an outer or inner layer of wires is attached to the damping weight, whilst the remaining layer(s) of wires is/are free to slide with respect to the attached layer of wires. For example, this may be achieved by placing a sheath or similar covering over the inner layer(s) of strands so that the bonding metal or resin forms a bond between the outer layer of wires and the damping weight only and does not penetrate the inner layer(s).

Figure 5:
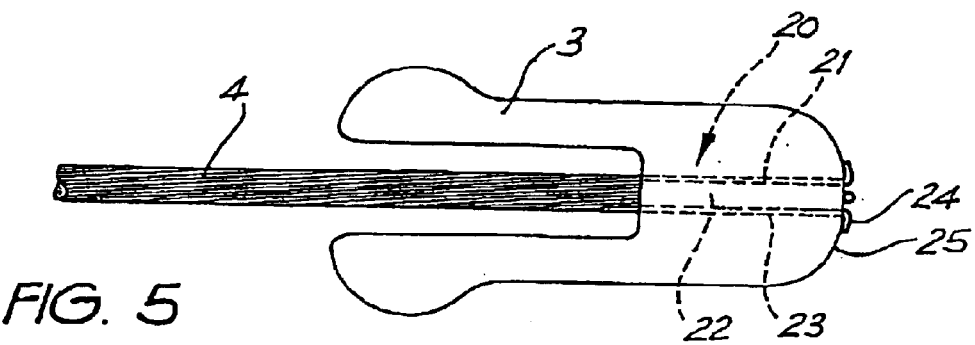
FIG. 5 is an enlarged view of one end of the Stockbridge damper illustrating a further example of a connection between the messenger cable and a damping weight according to the present invention.

(b) Passing either the outer or inner strand layers of the messenger cable through the damping weight and attaching thereto by welding. An example of this embodiment is depicted in FIG. 5, wherein the damping weight 3 is provided with an aperture 23 which passes through the body of the damping weight, with the strands 24 of the outer layer 21 of the messenger cable 4 being welded onto the outer end 25 of the damping weight.

(c) Cutting, or otherwise breaking, either the outer or inner layer of strands of the messenger cable in the region of the connection, such that one layer of strands is connected to the damping weight, whilst the remaining layer(s) of wires is/are free to slide with respect to the attached layer of wires.

(d) Trimming either the outer or inner layer of strands such that the damping weight is connected only to the inner or outer layer of wires respectively.

Figure 6:
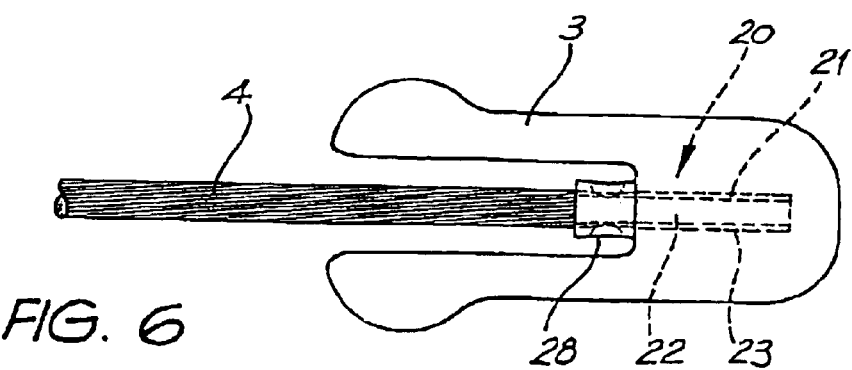
FIG. 6 is an enlarged view of one end of the Stockbridge damper illustrating a further example of a connection between the messenger cable and a damping weight according to the present invention.

(e) Pressing the damper weight onto the outer layer of strands of the messenger cable. An example of this embodiment of the invention is depicted in FIG. 6 wherein the damping weight is provided with a boss 28 which is crimped or otherwise compressed so as to form a mechanical connection with the outer layer of strands of the messenger cable only.

Figure 7:
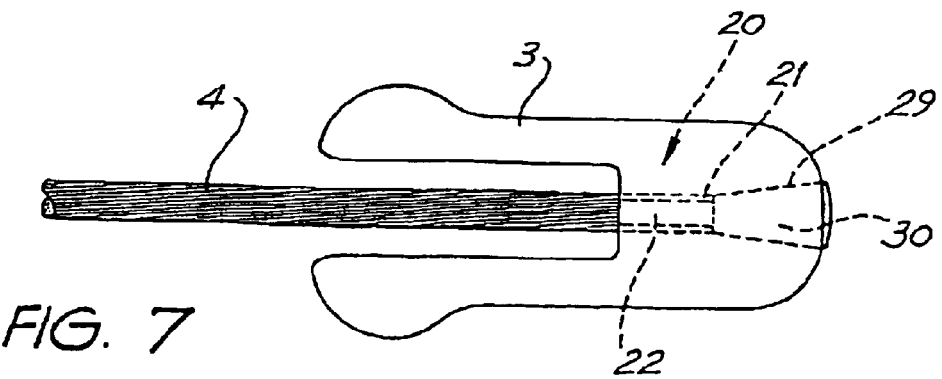
FIG. 7 is an enlarged view of one end of the Stockbridge damper illustrating a further example of a connection between the messenger cable and a damping weight according to the present invention.

(f) Using a collett or similar mechanical attachment means to connect the outer or inner strand layer of the messenger cable to the damping weight. An example of this embodiment of the invention is depicted in FIG. 7, wherein the damping weight 3 is provided with an aperture 23 which passes through the body of the damping weight, the aperture including a tapered section 29. A collett 30 is attached at the end of the messenger cable to one strand layer, the collett being provided with a tapered outer surface complementary to the tapered inner section 29 of the aperture 23 in the damping weight. The collett is then pressed into the damping weight to form a connection between the end of the messenger cable and the damping weight.

Although the invention has been described with reference to specific examples it will be appreciated by those skilled in the art that the invention may be embodied in many other forms.

What is claimed is:

1. A Stockbridge vibration damper comprising a pair of damping weights joined by a stranded steel cable, a clamp attached to the cable at a location intermediate the damping weights for attachment to an overhead power transmission line, the cable comprising an outer strand layer comprised of a plurality of wires and at least one inner strand layer comprised of at least one wire, wherein at each localized point of connection between the damping weights and the cable, only one of the outer strand layer or the at least one inner strand layer is fixed to the respective weights, and the other of the outer strand layer or the at least one inner strand layer is free to slide with respect to the fixed strand layer from and including each end of said cable to said clamp.

2. The Stockbridge vibration damper as defined in claim 1 wherein the ends of each layer are allowed to move longitudinally in relation to the other layer(s).

3. The Stockbridge vibration damper as defined in claim 1 wherein a bonding metal or resin is employed to bond the strands between the outer layers and the damping weights and the bonding metal or resin is prevented from penetrating between the layers.

4. The Stockbridge vibration damper as defined in claim 1 wherein either the outer or inner strand layer(s) of the cable are passed through the damping weights and attached thereto by welding.

5. The Stockbridge vibration damper as defined in claim 1 wherein the strands of either the outer or inner layer(s) of the cable are cut or otherwise broken in the region of the connection, such that one layer of strands is connected to the damping wieghts, whilst the remaining layer(s) of strands is/are free to slide with respect to the attached layer of strands.

6. The Stockbridge vibration damper as defined in claim 1 wherein either the outer or inner layer(s) of strands is/are trimmed such that the damping weights are connected only to the inner or outer layer of strands respectively.

7. The Stockbridge vibration damper as defined in claim 1 wherein the damping weights are pressed onto the outer layer of strands of the cable.

8. The Stockbridge vibration damper as defined in claim 1 wherein a collet is employed to connect the outer or inner layer(s) of the cable to the damping weights.

9. A method of producing a Stockbridge vibration damper comprising a pair of damping weights joined by a stranded steel cable, a clamp attached to the cable at a location intermediate the damping weights for attachment to an overhead power transmission line, the cable comprising an outer strand layer comprised of a plurality of wires and at least one inner strand layer comprised of at least one wire, wherein at each localized point of connection between the damping weights and the cable, only one of the outer strand layer or the at least one inner strand layer is fixed to the respective weights and the other of the outer strand layer or the at least one inner strand layer is free to slide with respect to the fixed strand layer from and including each end of said cable to said clamp.

10. The method of producing the Stockbridge vibration damper as defined in claim 9 wherein the ends of each layer are allowed to move longitudinally in relation to the other layer(s).

11. The method of producing the Stockbridge vibration damper as defined in claim 9 wherein a bonding metal or resin is employed to bond the strands of the outer layers and the damping weights and the bonding metal or resin is prevented from penetrating between the layers.

12. The method of producing the Stockbridge vibration damper as defined in claim 9 wherein either the outer or inner strand layer(s) of the cable are passed through the damping weights and attached thereto by welding.

13. The method of producing the Stockbridge vibration damper as defined in claim 9 wherein either the outer or inner layer(s) of strands of the cable are cut or otherwise broken in the region of the connection, such that one layer of strands is connected to the damping weights, whilst the remaining layer(s) of strands is/are free to slide with respect to the attached layer of strands.

14. The method of producing the Stockbridge vibration damper as defined in claim 9 wherein either the outer or inner layers of strands is trimmed such that the damping weights are connected only to the inner or outer layer of strands respectively.

15. The method of producing the Stockbridge vibration damper as defined in claim 9 wherein the damping weights are pressed onto the outer layer of strands of the cable.

16. The method of producing the Stockbridge vibration damper as defined in claim 9 wherein a collet is employed to connect the outer or inner strand layer(s) of the cable to the damping weights.

17. The Stockbridge vibration damper as defined in claim 1 wherein the cable comprises two layers of helically laid up high tensile steel.

18. The Stockbridge vibration damper as defined in claim 1 wherein the cable comprises three layers of helically laid up high tensile steel.

19. The method of producing the Stockbridge vibration damper as defined in claim 9 wherein the cable comprises two layers of helically laid up high tensile steel.

20. The method of producing the Stockbridge vibration damper as defined in claim 9 wherein the cable comprises three layers of helically laid up high tensile steel.

21. The Stockbridge vibration damper as defined in claim 1 wherein only the outer strand layer is fixed to the weights.

22. The Stockbridge vibration damper as defined in claim 1 wherein only the inner strand layer is fixed to the weights.

23. The method of producing the Stockbridge vibration damper as defined in claim 9 wherein only the outer strand layer is fixed to the weights.

24. The method of producing the Stockbridge vibration damper as defined in claim 9 wherein only the inner strand layer is fixed to the weights.

* * * * *

UNITED STATES PATENT AND TRADEMARK OFFICE
CERTIFICATE OF CORRECTION

PATENT NO. : 6,943,290 B2  Page 1 of 1
APPLICATION NO. : 10/332917
DATED : September 13, 2005
INVENTOR(S) : Philip Wellesley Dulhunty It is certified that error appears in the above-identified patent and that said Letters Patent is hereby corrected as shown below:

Face of Patent, See Item (86), line 3, "(2), (4) Date: Aug. 26, 2003" should read
-- (2), (4) Date: Aug. 25, 2003 --

Face of Patent, See Item (57) ABSTRACT, line 4, "damper comprising" should read
--damper having --

Face of Patent, See Item (57) ABSTRACT, line 5, "cable, a" should read -- cable and --

Face of Patent, See Item (57) ABSTRACT, line 8, "cable comprises" should read
-- cable has --

Column 1, line 5, delete "FIELD OF THE INVENTION" and insert the following:
          -- BACKGROUND OF THE INVENTION
1. Field of the Invention --

Column 1, lines 10-11, delete "BACKGROUND OF THE INVENTION
                1. Field of the Invention" and insert at line 11 the following"
-- 2. Description of the Prior Art --

Column 1, line 24, delete "2. Description of the Prior Art"

Signed and Sealed this

Nineteenth Day of September, 2006

JON W. DUDAS
*Director of the United States Patent and Trademark Office*